United States Patent
Pan et al.

(10) Patent No.: US 12,456,722 B2
(45) Date of Patent: Oct. 28, 2025

(54) POSITIVE ELECTRODE ACTIVE MATERIAL COMPOSITION, POSITIVE ELECTRODE PLATE, BATTERY, AND ELECTRIC APPARATUS

(71) Applicant: CONTEMPORARY AMPEREX TECHNOLOGY (HONG KONG) LIMITED, Hong Kong (CN)

(72) Inventors: Jianfu Pan, Ningde (CN); Xiaofu Xu, Ningde (CN); Yibo Shang, Ningde (CN); Yiming Qin, Ningde (CN); Xinyu Zhang, Ningde (CN); Renjie Pei, Ningde (CN); Jianfu He, Ningde (CN); Qian Liu, Ningde (CN); Yonghuang Ye, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/210,797

(22) Filed: May 16, 2025

(65) Prior Publication Data
US 2025/0279410 A1 Sep. 4, 2025

Related U.S. Application Data

(63) Continuation of application No. PCT/CN2024/074885, filed on Jan. 31, 2024.

(30) Foreign Application Priority Data

Mar. 24, 2023 (CN) .......................... 202310300316.1

(51) Int. Cl.
| | | |
|---|---|---|
| H01M 4/505 | (2010.01) | |
| C01B 25/16 | (2006.01) | |
| C01B 25/26 | (2006.01) | |
| C01B 25/45 | (2006.01) | |
| H01M 4/131 | (2010.01) | |
| H01M 4/133 | (2010.01) | |

(Continued)

(52) U.S. Cl.
CPC ........... *H01M 4/364* (2013.01); *H01M 4/131* (2013.01); *H01M 4/133* (2013.01); *H01M 4/136* (2013.01);
(Continued)

(58) Field of Classification Search
None
See application file for complete search history.

(56) References Cited

U.S. PATENT DOCUMENTS

| 2012/0156565 A1 | 6/2012 | Kim et al. |
| 2014/0199475 A1 | 7/2014 | Tonegawa et al. |

(Continued)

FOREIGN PATENT DOCUMENTS

| CN | 114512641 A | 5/2022 |
| CN | 114512644 A | 5/2022 |
| KR | 20090082790 A | 7/2009 |

OTHER PUBLICATIONS

International Search Report dated Mar. 25, 2024 for application PCT/CN2024/074885.
(Continued)

*Primary Examiner* — Yoshitoshi Takeuchi
(74) *Attorney, Agent, or Firm* — Ladas & Parry LLP (57) ABSTRACT

A positive electrode active material composition, a positive electrode plate, a battery, and an electric apparatus are described. The positive electrode active material composition includes a first positive electrode active material and a second positive electrode active material, where the first positive electrode active material includes a core $Li_aA_bMn_yB_{1-y}P_{1-d}R_dO_{4-n}D_n$ and a coating layer covering the core. The coating layer comprises one or more of pyrophosphate, phosphate, and carbon. The second positive electrode active material includes a compound $LiNi_xCo_yM_{1-x-y}O_2$; and $0.018m+0.003f \leq z \leq 0.02m+0.02f$ is satisfied.

14 Claims, 3 Drawing Sheets

(51) Int. Cl.
*H01M 4/136* (2010.01)
*H01M 4/1397* (2010.01)
*H01M 4/36* (2006.01)
*H01M 4/525* (2010.01)
*H01M 4/58* (2010.01)
*H01M 4/587* (2010.01)
*H01M 4/02* (2006.01)

(52) U.S. Cl.
CPC .......... *H01M 4/366* (2013.01); *H01M 4/525* (2013.01); *H01M 4/582* (2013.01); *H01M 4/5825* (2013.01); *H01M 4/587* (2013.01); *H01M 2004/021* (2013.01); *H01M 2004/028* (2013.01)

(56) References Cited

U.S. PATENT DOCUMENTS

| | | | |
|---|---|---|---|
| 2016/0351898 A1 | 12/2016 | Fang et al. | |
| 2022/0393227 A1* | 12/2022 | Liu | H01M 10/0525 |
| 2022/0393311 A1* | 12/2022 | Liu | H01M 50/489 |
| 2022/0399607 A1* | 12/2022 | Liu | H01M 50/209 |
| 2023/0361282 A1* | 11/2023 | Ji | H01M 4/5825 |

OTHER PUBLICATIONS

Written Opinion dated Mar. 25, 2024 for application PCT/CN2024/074885.

* cited by examiner

POSITIVE ELECTRODE ACTIVE MATERIAL COMPOSITION, POSITIVE ELECTRODE PLATE, BATTERY, AND ELECTRIC APPARATUS

CROSS REFERENCE TO RELATED APPLICATIONS

This application is a continuation of International application PCT/CN2024/074885 filed on Jan. 31, 2024 that claims priority to Chinese Patent Application No. 202310300316.1 filed on Mar. 24, 2023. The content of these applications are incorporated herein by reference in their entirety.

TECHNICAL FIELD

This application relates to the field of lithium battery technologies, and in particular, to a positive electrode active material composition, a positive electrode plate, a battery, and an electric apparatus.

BACKGROUND

In recent years, with increasingly wide use of secondary batteries, secondary batteries have been widely used in energy storage power supply systems such as hydroelectric, thermal, wind, and solar power plants, and many other fields including electric tools, electric bicycles, electric motorcycles, electric vehicles, military equipment, and aerospace. Due to the great development in secondary batteries, there is an urgent need to improve their storage performance while improving their cycling performance.

SUMMARY

This application has been made in view of the foregoing issues, with an objective to provide a positive electrode active material composition, a positive electrode plate, a battery, and an electric apparatus. The adoption of the positive electrode active material composition of this application is conducive to improving the storage performance of a battery and helps to suppress the dissolution of $Mn^{2+}$ ions and improve the cycling performance of the battery.

To achieve the foregoing objective, a first aspect of this application provides a positive electrode active material composition including a first positive electrode active material and a second positive electrode active material, where the first positive electrode active material includes a core and a coating layer covering the core; the coating layer includes one or more of pyrophosphate, phosphate, and carbon; and the core includes a compound $Li_aA_bMn_fB_{1-f}P_{1-d}R_dO_{4-n}D_n$, where A includes one or more elements of Zn, Al, Na, K, Mg, Nb, Mo, and W;

B includes one or more elements of Ti, V, Zr, Fe, Ni, Mg, Co, Ga, Sn, Sb, Nb, and Ge, and optionally includes one or more of Fe, Ti, V, Ni, Co, and Mg;

R includes one or more elements of B (boron), S, Si, and N;

D includes one or more elements of S, F, Cl, and Br;

a is 0.9 to 1.1, optionally 0.977 to 1; b is 0 to 0.1, optionally 0 to 0.001; f is 0.1 to 0.999, optionally 0.1 to 0.9; d is 0 to 0.1, optionally 0 to 0.001 or 0.001 to 0.1; and n is 0 to 0.1, optionally 0 to 0.001 or 0.001 to 0.1;

the second positive electrode active material includes a compound $LiNi_xCo_yM_{1-x-y}O_2$, where M includes one or more elements of Al, Mn, Mg, Nb, Ti, and Ba; 0.5≤x≤0.69; and 0<y<0.31;

and $0.018m+0.003f \leq z \leq 0.02m+0.02f$ is satisfied, where m represents a mass percentage of the first positive electrode active material in the positive electrode active material composition; and z represents a ratio of a coating layer thickness to a particle size $D_v50$ of the first positive electrode active material.

A lithium manganese iron phosphate material has a high voltage plateau and energy density. However, the lithium manganese iron phosphate material is almost an insulator, affecting the exertion of the electrochemical performance of the material. The Jahn-Teller effect caused by $Mn^{3+}$ ions in the material easily leads to lattice deformation, and $Mn^{2+}$ ions dissolved by the decomposition of the $Mn^{3+}$ ions easily cause damage to an SEI film on a negative electrode, leading to degraded cycling performance of a battery. Coated lithium manganese iron phosphate is conducive to increasing the electronic conductivity of the material and suppressing the dissolution of $Mn^{2+}$ ions. However, the inventors of this application have found that the existing coated lithium manganese iron phosphate is prone to reaction with an electrolyte in a high-SOC storage stage, leading to the deterioration in the storage performance of the battery.

Therefore, this application combines the first positive electrode active material and the second positive electrode active material, and defines a relationship between the ratio of the coating layer thickness to the particle size $D_v50$ of the first positive electrode active material, the percentage of the first positive electrode active material, and the amount of Mn. Due to the adoption of the second positive electrode active material with good conductivity, the ratio of the coating layer thickness to the particle size $D_v50$ of the first positive electrode active material can be appropriately reduced to reduce reactions between the coating layer and the electrolyte in the high-SOC storage stage, thereby improving the storage performance of the battery. In addition, the ratio of the coating layer thickness to the particle size $D_v50$ of the first positive electrode active material cannot be excessively low, otherwise, the dissolution of $Mn^{2+}$ ions cannot be suppressed, leading to degraded cycling performance of the battery.

In any embodiment, the coating layer thickness of the first positive electrode active material is 2-15 nm, optionally 5-11 nm. Thus, the dissolution of $Mn^{2+}$ ions is further suppressed, improving the cycling performance of the battery.

In any embodiment, the particle size $D_v50$ of the first positive electrode active material is 400-1600 nm, optionally 420-730 nm. Thus, this is conducive to increasing the conductivity of the first positive electrode active material.

In any embodiment, f is 0.3 to 0.8. Thus, this can increase the voltage plateau of the first positive electrode active material, reduce the defects in the material, reduce the side reactions, and improve the cycling performance of the battery and the conductivity of the material.

In any embodiment, in the first positive electrode active material, the coating layer includes carbon.

In any embodiment, m is 30%-80%. Thus, this is conducive to comprehensively improving the electrical performance and cost benefits of the battery.

A second aspect of this application further provides a positive electrode plate. The positive electrode plate includes a positive electrode current collector and a positive electrode film layer disposed on at least one surface of the positive electrode current collector, where the positive electrode film layer includes the positive electrode active material composition according to the first aspect of this application.

Thus, the adoption of the positive electrode plate of this application is conducive to suppressing the reactions between the positive electrode active material and an electrolyte in a high-SOC storage stage, thereby improving the storage performance of a battery. In addition, the dissolution of $Mn^{2+}$ ions is suppressed, and the cycling performance of the battery is improved.

A third aspect of this application further provides a positive electrode plate. The positive electrode plate includes a positive electrode current collector and a positive electrode film layer disposed on at least one surface of the positive electrode current collector, where the positive electrode film layer includes a positive electrode active material; at least one positive electrode film layer has a multi-layer structure, and different layers of the at least one positive electrode film layer with the multi-layer structure respectively include a first positive electrode active material and a second positive electrode active material; and the first positive electrode active material and the second positive electrode active material are as described in the first aspect of this application;
and
$0.018m'+0.003f \leq z \leq 0.02m'+0.02f$ is satisfied,
where
  m' represents a mass percentage of the first positive electrode active material in the positive electrode active material;
  z represents a ratio of a coating layer thickness to a particle size $D_v50$ of the first positive electrode active material; and
  optionally, m' is 30%-80%.

Thus, the positive electrode plate of this application is conducive to suppressing the reactions between the positive electrode active material and an electrolyte in a high-SOC storage stage, thereby improving the storage performance of a battery. In addition, the dissolution of $Mn^{2+}$ ions is suppressed, and the cycling performance of the battery is improved.

A fourth aspect of this application provides a battery. The battery includes the positive electrode active material composition according to the first aspect of this application, the positive electrode plate according to the second aspect of this application, or the positive electrode plate according to the third aspect of this application.

In this application, the battery includes but is not limited to a secondary battery, a battery module, and a battery pack.

A fifth aspect of this application provides an electric apparatus. The electric apparatus includes the positive electrode active material composition according to the first aspect of this application, the positive electrode plate according to the second aspect of this application, the positive electrode plate according to the third aspect of this application, or the battery according to the fourth aspect of this application.

DESCRIPTION OF REFERENCE SIGNS 1. battery pack; 2. upper box body; 3. lower box body; 4. battery module; 5. secondary battery; 51. housing; 52. electrode assembly; and 53. cover plate.

DETAILED DESCRIPTION

Embodiments that specifically disclose a positive electrode active material composition, a positive electrode plate, a secondary battery, a battery module, a battery pack, and an electric apparatus in this application are described in detail below with reference to the accompanying drawings as appropriate. However, there may be cases where unnecessary detailed descriptions are omitted. For example, detailed descriptions of well-known matters and repeated descriptions of actually identical structures have been omitted. This is to avoid unnecessarily prolonging the following descriptions, for ease of understanding by persons skilled in the art. In addition, the accompanying drawings and the following descriptions are provided for persons skilled in the art to fully understand this application and are not intended to limit the subject described in the claims.

"Ranges" disclosed in this application are defined in the form of lower and upper limits. A given range is defined by one lower limit and one upper limit selected, where the selected lower and upper limits define boundaries of that particular range. Ranges defined in this way may or may not include end values, and any combination may be used, meaning that any lower limit may be combined with any upper limit to form a range. For example, if ranges of 60-120 and 80-110 are provided for a specific parameter, it is understood that ranges of 60-110 and 80-120 can also be envisioned. In addition, if lower limit values of a range are given as 1 and 2, and upper limit values of the range are given as 3, 4, and 5, the following ranges can all be envisioned: 1-3, 1-4, 1-5, 2-3, 2-4, and 2-5. In this application, unless otherwise specified, a value range of "a-b" is a short representation of any combination of real numbers between a and b, where both a and b are real numbers. For example, a value range of "0-5" means that all real numbers in the range of "0-5" are listed herein, and "0-5" is just a short representation of a combination of these values. In addition, a parameter expressed as an integer greater than or equal to 2 is equivalent to disclosure that the parameter is, for example, an integer among 2, 3, 4, 5, 6, 7, 8, 9, 10, 11, 12, and so on.

Unless otherwise specified, all the embodiments and optional embodiments of this application can be combined with each other to form new technical solutions.

Unless otherwise specified, all the technical features and optional technical features of this application can be combined with each other to form new technical solutions.

Unless otherwise specified, all the steps in this application can be performed in the order described or in random order, preferably, in the order described. For example, the method including steps (a) and (b) indicates that the method may include steps (a) and (b) performed sequentially or may include steps (b) and (a) performed sequentially. For example, the foregoing method may further include step (c), which indicates that step (c) may be added to the method in any ordinal position, for example, the method may include steps (a), (b), and (c), steps (a), (c), and (b), steps (c), (a), and (b), or the like.

Unless otherwise specified, "include" and "contain" mentioned in this application are inclusive or may be exclusive. For example, the terms "include" and "contain" can mean that other unlisted components may also be included or contained, or only listed components are included or contained.

Unless otherwise specified, in this application, the term "or" is inclusive. For example, the phrase "A or B" means "A, B, or both A and B". More specifically, any one of the following conditions satisfies the condition "A or B": A is true (or present) and B is false (or not present); A is false (or not present) and B is true (or present); or both A and B are true (or present).

Unless otherwise specified, in this application, "particle size $D_v50$" is a particle size where the cumulative distribution by volume reaches 50% as counted from the small particle size side.

[Secondary Battery]

The secondary battery, also referred to as a rechargeable battery or a storage battery, is a battery whose active material can be activated for continuous use through charging after the battery is discharged.

Typically, the secondary battery includes a positive electrode plate, a negative electrode plate, a separator, and an electrolyte. During charging and discharging of the battery, active ions (for example, lithium ions) are intercalated and deintercalated back and forth between the positive electrode plate and the negative electrode plate. The separator is disposed between the positive electrode plate and the negative electrode plate to mainly prevent short circuits between positive and negative electrodes and to allow the active ions to pass through. The electrolyte is between the positive electrode plate and the negative electrode plate to mainly conduct the active ions.

[Positive Electrode Active Material Composition]

An embodiment of this application provides a positive electrode active material composition including a first positive electrode active material and a second positive electrode active material, where the first positive electrode active material includes a core and a coating layer covering the core; the coating layer includes one or more of pyrophosphate, phosphate, and carbon; and the core includes a compound $Li_aA_bMn_fB_{1-f}P_{1-d}R_dO_{4-n}D_n$, where A includes one or more elements of Zn, Al, Na, K, Mg, Nb, Mo, and W;

B includes one or more elements of Ti, V, Zr, Fe, Ni, Mg, Co, Ga, Sn; Sb, Nb, and Ge, and optionally includes one or more elements of Fe, Ti, V, Ni, Co, and Mg;

R includes one or more elements of B (boron), S, Si, and N;

D includes one or more elements of S, F, Cl, and Br;

a is 0.9 to 1.1, optionally 0.977 to 1, for example, 0.9, 0.93, 0.95, 0.98, 1, 1.1, or a range defined by any of these values; b is 0 to 0.1, optionally 0 to 0.001, for example, 0, 0.001, 0.002, 0.005, 0.007, 0.01, 0.03, 0.05, 0.07, 0.09, 0.1, or a range defined by any of these values; f is 0.1 to 0.999, optionally 0.1 to 0.9, for example, 0.1, 0.2, 0.3, 0.4, 0.5, 0.6, 0.7, 0.8, 0.9, 0.95, 0.98, 0.999, or a range defined by any of these values;

d is 0 to 0.1, optionally 0 to 0.001 or 0.001 to 0.1, for example, 0, 0.001, 0.002, 0.005, 0.007, 0.01, 0.03, 0.05, 0.07, 0.09, 0.1, or a range defined by any of these values; n is 0 to 0.1, optionally 0 to 0.001 or 0.001 to 0.1, for example, 0, 0.001, 0.002, 0.005, 0.007, 0.01, 0.03, 0.05, 0.07, 0.09, 0.1, or a range defined by any of these values;

the second positive electrode active material includes a compound $LiNi_xCo_yM_{1-x-y}O_2$, where M includes one or more elements of Al, Mn, Mg, Nb, Ti, and Ba; $0.5 \leq x \leq 0.69$, for example, x is 0.52, 0.55, 0.57, 0.58, 0.6, 0.63, 0.64, 0.66, or 0.69, or falls within a range defined by any of these values; and $0 < y < 0.31$, for example, y is 0.001, 0.003, 0.005, 0.01, 0.02, 0.03, 0.05, 0.07, 0.1, 0.13, 0.15, 0.17, 0.2, 0.22, 0.25, 0.27, 0.28, or 0.3, or falls within a range defined by any of these values;

and $0.018m + 0.003f \leq z \leq 0.02m + 0.02f$ is satisfied, where m represents a mass percentage of the first positive electrode active material in the positive electrode active material composition;

z represents a ratio of a coating layer thickness to a particle size $D_v50$ of the first positive electrode active material; and f is f in the core compound $Li_aA_bMn_fB_{1-f}P_{1-d}R_dO_{4-n}D_n$ of the first positive electrode active material.

A lithium manganese iron phosphate material has a high voltage plateau and energy density. However, the lithium manganese iron phosphate material is almost an insulator, affecting the exertion of the electrochemical performance of the material. The Jahn-Teller effect caused by $Mn^{3+}$ ions in the material easily leads to lattice deformation, and $Mn^{2+}$ ions dissolved by the decomposition of the $Mn^{3+}$ ions easily cause damage to an SEI film on a negative electrode, leading to degraded cycling performance of a battery. Coated lithium manganese iron phosphate is conducive to increasing the electronic conductivity of the material and suppressing the dissolution of $Mn^{2+}$ ions. However, the inventors of this application have found that the existing coated lithium manganese iron phosphate is prone to reaction with an electrolyte in a high-SOC storage stage, leading to the deterioration in the storage performance of the battery.

Although the mechanism is not yet clear, the applicant of this application has unexpectedly found that this application combines the first positive electrode active material and the second positive electrode active material, and defines a relationship between the ratio of the coating layer thickness to the particle size $D_v50$ of the first positive electrode active material, the percentage of the first positive electrode active material, and the amount of Mn. Due to the adoption of the second positive electrode active material with good conductivity, the ratio of the coating layer thickness to the particle size $D_v50$ of the first positive electrode active material can be appropriately reduced to reduce reactions between the coating layer and the electrolyte in the high-SOC storage stage, thereby improving the storage performance of the battery. In addition, the ratio of the coating layer thickness to the particle size $D_v50$ of the first positive electrode active material cannot be excessively low, otherwise the dissolution of $Mn^{2+}$ ions cannot be suppressed, leading to degraded cycling performance of the battery.

In some embodiments, the compound $Li_aA_bMn_fB_{1-f}P_{1-d}R_dO_{4-n}D_n$ remains electrically neutral.

In some embodiments, the compound $LiNi_xCo_yM_{1-x-y}O_2$ remains electrically neutral.

In some embodiments, the coating layer thickness of the first positive electrode active material is 2-15 nm, optionally 5-11 nm, for example, 2 nm, 3 nm, 4 nm, 5 nm, 6 nm, 7 nm, 8 nm, 9 nm, 10 nm, 12 nm, 13 nm, 15 nm, or a range defined by any of these values. Thus, the dissolution of $Mn^{2+}$ ions is further suppressed, improving the cycling performance of the battery.

In some embodiments, the coating layer thickness can be measured using conventional methods in the art, for example, FIB. The specific method may include the following steps: randomly selecting a single particle from positive electrode active material powder under test, cutting a thin slice with a thickness of about 100 nm from a middle position or near the middle position of the selected particle, then performing a TEM test on the thin slice, measuring a coating layer thickness, performing measurement at 3-5 positions, and taking an average value.

In some embodiments, the particle size $D_v50$ of the first positive electrode active material is 400-1600 nm, optionally 420-730 nm, for example, 400 nm, 420 nm, 450 nm, 470 nm, 500 nm, 520 nm, 550 nm, 580 nm, 600 nm, 650 nm, 700 nm, 730 nm, 750 nm, 770 nm, 800 nm, 830 nm, 850 nm, 870 nm, 900 nm, 1000 nm, 1200 nm, 1300 nm, 1500 nm, 1600 nm, or a range defined by any of these values. Thus, this is conducive to increasing the conductivity of the first positive electrode active material.

In some embodiments, the particle size $D_v50$ is measured using conventional methods in the art, for example, using a method in accordance with the national standard GB/T 19077-2016 Particle Size Distribution Laser Diffraction Method.

In some embodiments, f is 0.3 to 0.8. Thus, this can increase the voltage plateau of the first positive electrode active material, reduce the defects in the material, reduce the side reactions, and improve the cycling performance of the battery and the conductivity of the material.

In some embodiments, in the first positive electrode active material, the coating layer includes carbon.

In some embodiments, m is 30%-80%, for example, 30%, 40%, 50%, 60%, 70%, 80%, or a range defined by any of these values. Thus, this is conducive to comprehensively improving the electrical performance and cost benefits of the battery.

[Positive Electrode Plate]

An embodiment of this application provides a positive electrode plate. The positive electrode plate includes a positive electrode current collector and a positive electrode film layer disposed on at least one surface of the positive electrode current collector, where the positive electrode film layer includes the positive electrode active material composition described above in this application.

Thus, the positive electrode plate of this application is conducive to suppressing the reactions between the positive electrode active material and an electrolyte in a high-SOC storage stage, thereby improving the storage performance of a battery. In addition, the dissolution of $Mn^{2+}$ ions is suppressed, and the cycling performance of the battery is improved.

Another embodiment of this application provides a positive electrode plate. The positive electrode plate includes a positive electrode current collector and a positive electrode film layer disposed on at least one surface of the positive electrode current collector, where the positive electrode film layer includes a positive electrode active material; at least one positive electrode film layer has a multi-layer structure; different layers of the at least one positive electrode film layer with the multi-layer structure respectively include a first positive electrode active material and a second positive electrode active material; and the first positive electrode active material and the second positive electrode active material are as described above;

and $0.018m'+0.003f \leq z \leq 0.02m'+0.02f$ is satisfied, where m' represents a mass percentage of the first positive electrode active material in the positive electrode active material;

z represents a ratio of a coating layer thickness to a particle size $D_v50$ of the first positive electrode active material; and optionally, m' is 30%-80%, for example, 30%, 40%, 50%, 60%, 70%, 80%, or a range defined by any of these values.

Thus, the positive electrode plate of this application is conducive to suppressing the reactions between the positive electrode active material and an electrolyte in a high-SOC storage stage, thereby improving the storage performance of a battery. In addition, the dissolution of $Mn^{2+}$ ions is suppressed, and the cycling performance of the battery is improved.

For example, the positive electrode current collector has two opposite surfaces in its thickness direction, and the positive electrode film layer is provided on either or both of the two opposite surfaces of the positive electrode current collector.

In some embodiments, the positive electrode current collector may be a metal foil or a composite current collector. For example, an aluminum foil may be used as the metal foil. The composite current collector may include a polymer material matrix and a metal layer formed on at least one surface of the polymer material matrix. The composite current collector may be formed by forming a metal material (aluminum, aluminum alloy, nickel, nickel alloy, titanium, titanium alloy, silver, silver alloy, or the like) on the polymer material matrix (for example, matrices of polypropylene (PP), polyethylene terephthalate (PET), polybutylene terephthalate (PBT), polystyrene (PS), and polyethylene (PE)).

In some embodiments, the positive electrode plate may further include other positive electrode active materials well-known in the art. For example, the positive electrode active material may include at least one of the following materials: olivine-structured lithium-containing phosphate, lithium transition metal oxide, or respective modified compounds thereof. However, this application is not limited to these materials, and may alternatively use other conventional materials that can be used as positive electrode active materials for batteries instead. One of these positive electrode active materials may be used alone, or two or more of them may be used in combination. Examples of the lithium transition metal oxide may include but are not limited to at least one of lithium cobalt oxide (for example, $LiCoO_2$), lithium nickel oxide (for example, $LiNiO_2$), lithium manganese oxide (for example, $LiMnO_2$ or $LiMn_2O_4$), lithium nickel cobalt oxide, lithium manganese cobalt oxide, lithium nickel manganese oxide, $LiNi_{1/3}Co_{1/3}Mn_{1/3}O_2$ (NCM333 for short), and modified compounds thereof. Examples of the olivine-structured lithium-containing phosphate may include but are not limited to at least one of lithium iron phosphate (for example, $LiFePO_4$ (LFP for short)), a composite material of lithium iron phosphate and carbon, lithium manganese phosphate (for example, $LiMnPO_4$), and a composite material of lithium manganese phosphate and carbon.

In some embodiments, the positive electrode film layer further optionally includes a binder. For example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

In some embodiments, the positive electrode film layer further optionally includes a conductive agent. For example, the conductive agent may include at least one of superconducting carbon, acetylene black, carbon black, Ketjen black, carbon dots, carbon nanotubes, graphene, and carbon nanofiber.

In some embodiments, the positive electrode plate may be prepared in the following manner: the foregoing constituents used for preparing the positive electrode plate, for example, the positive electrode active material, the conductive agent, the binder, and any other constituent, are dispersed in a solvent (for example, N-methylpyrrolidone) to form a positive electrode slurry; and the positive electrode slurry is applied onto the positive electrode current collector, followed by processes such as drying and cold pressing to obtain the positive electrode plate.

[Negative Electrode Plate]

The negative electrode plate includes a negative electrode current collector and a negative electrode film layer disposed on at least one surface of the negative electrode current collector, where the negative electrode film layer includes a negative electrode active material.

For example, the negative electrode current collector has two opposite surfaces in its thickness direction, and the negative electrode film layer is disposed on either or both of the two opposite surfaces of the negative electrode current collector.

In some embodiments, the negative electrode current collector may be a metal foil or a composite current collector. For example, a copper foil may be used as the metal foil. The composite current collector may include a polymer material matrix and a metal layer formed on at least one surface of the polymer material matrix. The composite current collector may be formed by forming a metal material (copper, copper alloy, nickel, nickel alloy, titanium, titanium alloy, silver, silver alloy, or the like) on the polymer material matrix (for example, matrices of polypropylene (PP), polyethylene terephthalate (PET), polybutylene terephthalate (PBT), polystyrene (PS), and polyethylene (PE)).

In some embodiments, the negative electrode active material may be a well-known negative electrode active material used for a battery in the art. For example, the negative electrode active material may include at least one of the following materials: artificial graphite, natural graphite, soft carbon, hard carbon, a silicon-based material, a tin-based material, lithium titanate, and the like. The silicon-based material may be selected from at least one of elementary silicon, silicon-oxygen compound, silicon-carbon composite, silicon-nitrogen composite, and silicon alloy. The tin-based material may be selected from at least one of elementary tin, tin-oxygen compound, and tin alloy. However, this application is not limited to these materials, and may alternatively use other conventional materials that can be used as negative electrode active materials for batteries instead. One of these negative electrode active materials may be used alone, or two or more of them may be used in combination.

In some embodiments, the negative electrode film layer further optionally includes a binder. For example, the binder may be selected from at least one of styrene-butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode film layer further optionally includes a conductive agent. For example, the conductive agent may be selected from at least one of superconducting carbon, acetylene black, carbon black, Ketjen black, carbon dots, carbon nanotubes, graphene, and carbon nanofiber.

In some embodiments, the negative electrode film layer further optionally includes other additives such as a thickener (for example, sodium carboxymethyl cellulose (CMC-Na)).

In some embodiments, the negative electrode plate may be prepared in the following manner: the constituents used for preparing the negative electrode plate, for example, the negative electrode active material, the conductive agent, the binder, and any other constituent, are dispersed in a solvent (for example, deionized water) to form a negative electrode slurry; and the negative electrode slurry is applied onto the negative electrode current collector, followed by processes such as drying and cold pressing to obtain the negative electrode plate.

[Electrolyte]

The electrolyte conducts ions between the positive electrode plate and the negative electrode plate. The electrolyte is not limited to any specific type in this application, and may be selected based on needs. For example, the electrolyte may be in a liquid state, a gel state, or an all-solid state.

In some embodiments, the electrolyte is in a liquid state and includes an electrolytic salt and a solvent.

In some embodiments, the electrolytic salt may be selected from at least one of lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium trifluoromethanesulfonate, lithium difluorophosphate, lithium difluoro(oxalato)borate, lithium bis(oxalato)borate, lithium difluorobis(oxalato)phosphate, and lithium tetrafluoro(oxalato)phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, methyl ethyl sulfone, and diethyl sulfone.

In some embodiments, the electrolyte further optionally includes an additive. For example, the additive may include a negative electrode film-forming additive and a positive electrode film-forming additive, or may include an additive that can improve some performance of the battery, for example, an additive for improving overcharge performance of the battery and an additive for improving high-temperature performance or low-temperature performance of the battery.

[Separator]

In some embodiments, the secondary battery further includes a separator. The separator is not limited to any particular type in this application, and may be any well-known porous separator with good chemical stability and mechanical stability.

In some embodiments, a material of the separator may be selected from at least one of glass fiber, non-woven fabric, polyethylene, polypropylene, and poly(vinylidene difluoride). The separator may be a single-layer film or a multi-layer composite film, which is not particularly limited. When the separator is a multi-layer composite film, all layers may be made of the same or different materials, which is not particularly limited.

In some embodiments, the positive electrode plate, the negative electrode plate, and the separator may be made into an electrode assembly through winding or lamination.

In some embodiments, the secondary battery may include an outer package.

The outer package may be used for packaging the foregoing electrode assembly and electrolyte.

In some embodiments, the outer package of the secondary battery may be a hard shell, for example, a hard plastic shell, an aluminum shell, or a steel shell. The outer package of the secondary battery may alternatively be a soft pack, for example, a soft pouch. A material of the soft pack may be plastic. As the plastic, polypropylene, polybutylene terephthalate, polybutylene succinate, and the like may be listed.

Figure 1:
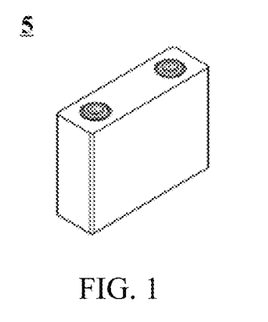
FIG. 1 is a schematic diagram of a secondary battery according to an embodiment of this application.

The secondary battery is not limited to any particular shape in this application, and may be cylindrical, rectangular, or of any other shapes. For example, FIG. 1 shows a secondary battery 5 of a rectangular structure as an example.

Figure 2:
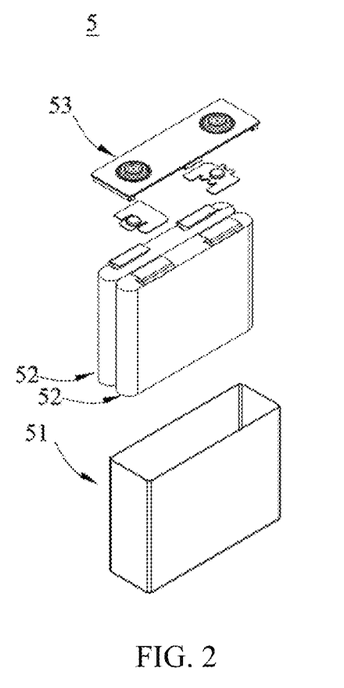
FIG. 2 is an exploded view of the secondary battery according to the embodiment of this application in FIG. 1.

In some embodiments, referring to FIG. 2, the outer package may include a housing 51 and a cover plate 53. The housing 51 may include a base plate and side plates connected to the base plate, and the base plate and the side plates enclose an accommodating cavity. The housing 51 has an opening in communication with the accommodating cavity, and the cover plate 53 can cover the opening to close the accommodating cavity. The positive electrode plate, the negative electrode plate, and the separator may be made into an electrode assembly 52 through winding or lamination. The electrode assembly 52 is packaged in the accommodating cavity. The electrolyte infiltrates into the electrode assembly 52. The secondary battery 5 may include one or more electrode assemblies 52, and persons skilled in the art may make choices based on actual requirements.

In some embodiments, the secondary battery may be assembled into a battery module, and the battery module may include one or more secondary batteries. The specific quantity may be chosen by persons skilled in the art according to use and capacity of the battery module.

Figure 3:
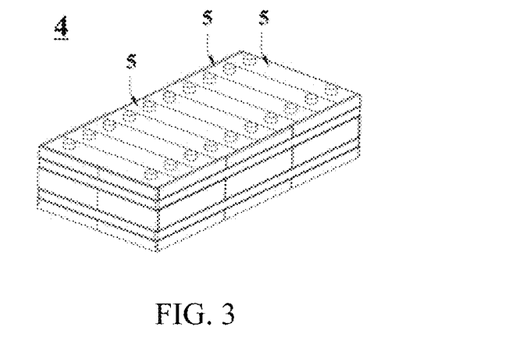
FIG. 3 is a schematic diagram of a battery module according to an embodiment of this application.

FIG. 3 shows a battery module 4 as an example. Referring to FIG. 3, in the battery module 4, a plurality of secondary batteries 5 may be sequentially arranged along a length direction of the battery module 4. Certainly, the secondary batteries may alternatively be arranged in any other manners. Further, the plurality of secondary batteries 5 may be fastened by fasteners.

Optionally, the battery module 4 may further include an enclosure with an accommodating space, and the plurality of secondary batteries 5 are accommodated in the accommodating space.

In some embodiments, the battery module may be further assembled into a battery pack, and the battery pack may include one or more battery modules. The specific quantity may be chosen by persons skilled in the art based on use and capacity of the battery pack.

Figure 4:
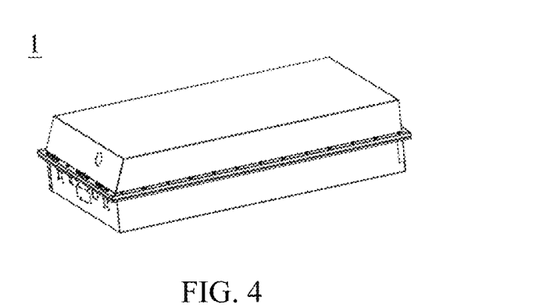
FIG. 4 is a schematic diagram of a battery pack according to an embodiment of this application.
Figure 5:
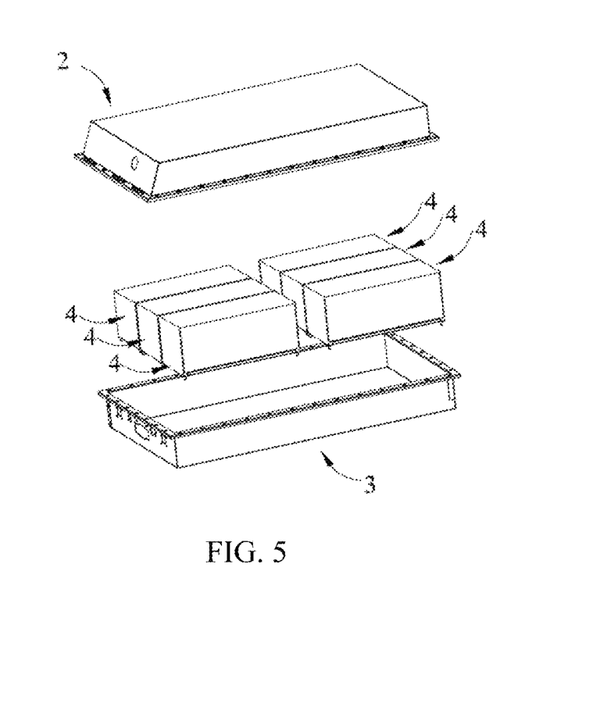
FIG. 5 is an exploded view of the battery pack according to the embodiment of this application in FIG. 4.

FIG. 4 and FIG. 5 show a battery pack 1 as an example. Referring to FIG. 4 and FIG. 5, the battery pack 1 may include a battery box and a plurality of battery modules 4 arranged in the battery box. The battery box includes an upper box body 2 and a lower box body 3. The upper box body 2 can cover the lower box body 3 to form an enclosed space for accommodating the battery modules 4. The plurality of battery modules 4 may be arranged in the battery box in any manner.

In addition, this application further provides an electric apparatus. The electric apparatus includes at least one of the secondary battery, the battery module, or the battery pack provided in this application. The secondary battery, the battery module, or the battery pack may be used as a power source for the electric apparatus or an energy storage unit of the electric apparatus. The electric apparatus may include a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite system, an energy storage system, and the like, but is not limited thereto.

The secondary battery, the battery module, or the battery pack may be selected for the electric apparatus based on requirements for using the electric apparatus.

Figure 6:
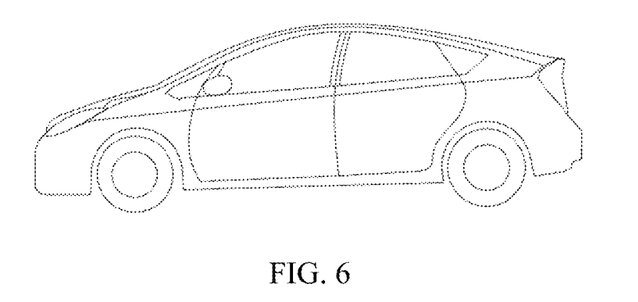
FIG. 6 is a schematic diagram of an electric apparatus using a secondary battery as a power source according to an embodiment of this application.

FIG. 6 shows an electric apparatus as an example. This electric apparatus is a battery electric vehicle, a hybrid electric vehicle, a plug-in hybrid electric vehicle, or the like. To satisfy requirements of the electric apparatus for high power and high energy density of the secondary battery, a battery pack or a battery module may be used.

EXAMPLES

The following describes examples of this application. The examples described below are illustrative and only used to explain this application, and cannot be construed as limitations on this application. Examples whose technical solutions or conditions are not specified are made in accordance with technical solutions or conditions described in literature in the field, or made in accordance with product instructions. The reagents or instruments used are all conventional products that are commercially available if no manufacturer is indicated.

Example 1

(1) First positive electrode active material: carbon-coated $LiMn_{0.3}Fe_{0.7}PO_4$, purchased from Shenzhen Dynanonic Co., Ltd.
(2) Second positive electrode active material: $LiNi_{0.80}CO_{0.10}Mn_{0.10}O_2$, purchased from Guangdong Brunp Recycling Technology Co., Ltd.
(3) Preparation of positive electrode plate: The first positive electrode active material, the second positive electrode active material, poly(vinylidene difluoride) (PVDF), and conductive carbon were dissolved in a solvent N-methylpyrrolidone (NMP) at a mass ratio of 28.95:67.55:2:1.5 and fully stirred and mixed to prepare a positive electrode slurry with a viscosity of 4000-15000 mPa·S; and the positive electrode slurry was uniformly applied onto a positive electrode current collector aluminum foil, followed by drying, cold pressing, and cutting, to obtain a positive electrode plate.
(4) Preparation of negative electrode plate: Graphite, sodium carboxymethyl cellulose (CMC-Na), styrene-butadiene rubber (SBR), and conductive carbon were added to a specified amount of deionized water, at a mass ratio of 95:1:2:2 and stirred to form a uniform slurry, with a viscosity controlled at 3000-10000 mPa·S. Then, the slurry was applied onto a copper foil, followed by drying, to prepare a negative electrode plate.

(5) Separator: a polyethylene (PE) porous polymer film.

(6) Preparation of electrolyte: Ethylene carbonate (EC), diethyl carbonate (DEC), and dimethyl carbonate (DMC) were mixed at a volume ratio of 1:1:1, and then $LiPF_6$ is uniformly dissolved in the above solution to obtain an electrolyte, where a concentration of $LiPF_6$ was 1 mol/L.

(7) Preparation of lithium-ion battery:

The prepared positive electrode plate, negative electrode plate, and separator were sequentially placed into a winding device, so that the separator was sandwiched between the positive electrode plate and the negative electrode plate. Then, the resulting stack was wound into a rectangular electrode assembly. Then, the electrode assembly was placed into an aluminum rectangular shell. A battery cell was dried under vacuum at a temperature above 100° C., followed by ultrasonic welding of positive and negative electrode tabs, with the positive and negative electrode tabs located on the same side of the battery cell. Then, the processes of electrolyte injection, standing, formation, aging, and capacity testing were performed to obtain a prepared lithium-ion battery.

Preparation methods of lithium-ion batteries in Examples 2 to 15 and Comparative examples 1 to 3 were similar to that in Example 1, with different product parameters shown in detail in Table 1. In the parameters, m represented a mass percentage of the first positive electrode active material in the two positive electrode active materials; z represented a ratio of a coating layer thickness to a particle size $D_v50$ of the first positive electrode active material; and f represented f in a general formula $Li_aA_bMn_fB_{1-f}P_{1-d}R_dO_{4-n}D_n$.

In Table 1, the first positive electrode active materials in Examples 1 to 12 were all purchased from Shenzhen Dynanonic Co., Ltd. The second positive electrode active materials in Examples 1 to 15 were all purchased from Guangdong Brunp Recycling Technology Co., Ltd.

Preparation Method of First Positive Electrode Active Material of Example 13

Preparation of doped manganese oxalate: 1.3 mol of $MnSO_4·H_2O$ and 0.7 mol of $FeSO_4·H_2O$ were well mixed in a mixer for 6 hours. The resulting mixture was transferred into a reactor, and 10 L of deionized water and 2 mol of oxalic acid dihydrate (calculated as oxalic acid) were added. The reactor was heated to 80° C. and stirred at a rotation speed of 600 rpm for 6 hours until the reaction ended (no bubble was generated), and an Fe-doped manganese oxalate suspension was obtained. Then, the suspension was filtered, and the resulting filter cake was dried at 120° C. and then ground to obtain Fe-doped manganese oxalate particles with a median particle size $D_v50$ of about 100 nm.

Preparation of doped lithium manganese phosphate: 1 mol of the manganese oxalate particles, 0.497 mol of lithium carbonate, 0.001 mol of $Mo(SO_4)_3$, an aqueous phosphoric acid solution containing 0.999 mol of phosphoric acid at a concentration of 85%, 0.001 mol of $H_4SiO_4$, 0.0005 mol of $NH_4HF_2$, and 0.005 mol of sucrose were added to 20 L of deionized water. The resulting mixture was transferred to a sand mill and fully ground and stirred for 10 hours to obtain a slurry. The slurry was transferred to a spray drying device for spray drying and granulation, with a drying temperature set to 250° C. and a drying time set to 4 hours, to obtain particles. In a protective atmosphere with nitrogen (90% by volume)+hydrogen (10% by volume), the powder was sintered at 700° C. for 10 hours to obtain carbon-coated $Li_{0.994}Mo_{0.001}Mn_{0.65}Fe_{0.35}P_{0.999}Si_{0.001}O_{3.999}F_{0.001}$. The percentages of elements in the positive electrode active material could be tested using inductively coupled plasma emission spectrometry (ICP).

Preparation Method of First Positive Electrode Active Material of Example 14

The preparation method of the first positive electrode active material of Example 14 was the same as the preparation method of the first positive electrode active material of Example 13, except that the amount of high-purity $Li_2CO_3$ was changed to 0.4885 mol, $Mo(SO_4)_3$ was replaced with $MgSO_4$, the amount of $FeSO_4·H_2O$ was changed to 0.68 mol, and 0.02 mol of $Ti(SO_4)_2$ was also added and $H_4SiO_4$ was replaced with $HNO_3$ during preparation of doped manganese oxalate.

Preparation Method of first Positive Electrode Active Material of Example 15

The preparation method of the first positive electrode active material of Example 15 was the same as the preparation method of the first positive electrode active material of Example 13, except that the amount of high-purity $Li_2CO_3$ was changed to 0.496 mol, $Mo(SO_4)_3$ was replaced with $W(SO_4)_3$, and $H_4SiO_4$ was replaced with $H_2SO_4$.

TABLE 1

Parameter results of Examples 1 to 15 and Comparative Examples 1 to 3

| | First positive electrode active material | | | |
|---|---|---|---|---|
| | Substance | | Coating layer thickness (nm) | Particle size $D_v50$ (nm) |
| | Core | Coating layer | | |
| Example 1 | $LiMn_{0.3}Fe_{0.7}PO_4$ | Carbon | 5.84 | 730 |
| Example 2 | $LiMn_{0.75}Fe_{0.25}PO_4$ | Carbon | 7.75 | 420 |
| Example 3 | $LiMn_{0.6}Fe_{0.4}PO_4$ | Carbon | 10.77 | 570 |
| Example 4 | $LiMn_{0.5}Fe_{0.5}PO_4$ | Carbon | 7.23 | 640 |
| Example 5 | $LiMn_{0.6}Fe_{0.4}PO_4$ | Carbon | 10.77 | 570 |
| Example 6 | $LiMn_{0.6}Fe_{0.4}PO_4$ | Carbon | 10.77 | 570 |
| Example 7 | $LiMn_{0.6}Fe_{0.4}PO_4$ | Carbon | 10.77 | 570 |
| Example 8 | $LiMn_{0.6}Fe_{0.4}PO_4$ | Carbon | 10.77 | 570 |
| Example 9 | $LiMn_{0.6}Fe_{0.4}PO_4$ | Carbon | 10.77 | 570 |

TABLE 1-continued

Parameter results of Examples 1 to 15 and Comparative Examples 1 to 3

| | | | | | |
|---|---|---|---|---|---|
| Example 10 | $LiMn_{0.6}Fe_{0.4}PO_4$ | | Carbon | 10.77 | 570 |
| Example 11 | $LiMn_{0.6}Fe_{0.4}PO_4$ | | Carbon | 10.77 | 570 |
| Example 12 | $LiMn_{0.6}Fe_{0.4}PO_4$ | | Carbon | 10.77 | 570 |
| Example 13 | $Li_{0.994}Mo_{0.001}Mn_{0.65}Fe_{0.35}P_{0.999}Si_{0.001}O_{3.999}F_{0.001}$ | | Carbon | 12.93 | 610 |
| Example 14 | $Li_{0.977}Mg_{0.001}Mn_{0.65}Fe_{0.34}Ti_{0.01}P_{0.999}N_{0.001}O_{3.999}F_{0.001}$ | | Carbon | 11.48 | 580 |
| Example 15 | $Li_{0.992}W_{0.001}Mn_{0.65}Fe_{0.35}P_{0.999}S_{0.001}O_{3.999}F_{0.001}$ | | Carbon | 12.10 | 590 |
| Comparative example 1 | $LiMn_{0.6}Fe_{0.4}PO_4$ | | Carbon | 10.77 | 570 |
| Comparative example 2 | $LiMn_{0.5}Fe_{0.5}PO_4$ | | Carbon | 7.23 | 640 |
| Comparative example 3 | $LiMn_{0.6}Fe_{0.4}PO_4$ | | Carbon | 17.93 | 586 |

| | First positive electrode active material | | | Upper and lower limits of z | | Second positive electrode active material | |
|---|---|---|---|---|---|---|---|
| | | | | $0.018m + 0.003f$ | $0.02m + 0.02f$ | Substance | Mass percentage |
| | m | z | f | | | | |
| Example 1 | 30% | 0.80% | 30% | 0.63% | 1.2% | $LiNi_{0.80}Co_{0.10}Mn_{0.10}O_2$ | 70% |
| Example 2 | 70% | 1.845% | 75% | 1.49% | 2.9% | $LiNi_{0.80}Co_{0.10}Mn_{0.10}O_2$ | 30% |
| Example 3 | 60% | 1.89% | 60% | 1.26% | 2.4% | $LiNi_{0.80}Co_{0.10}Mn_{0.10}O_2$ | 40% |
| Example 4 | 30% | 1.13% | 50% | 0.69% | 1.6% | $LiNi_{0.80}Co_{0.10}Mn_{0.10}O_2$ | 70% |
| Example 5 | 80% | 1.89% | 60% | 1.62% | 2.8% | $LiNi_{0.50}Co_{0.20}Mn_{0.30}O_2$ | 20% |
| Example 6 | 70% | 1.89% | 60% | 1.44% | 2.6% | $LiNi_{0.50}Co_{0.20}Mn_{0.30}O_2$ | 30% |
| Example 7 | 60% | 1.89% | 60% | 1.26% | 2.4% | $LiNi_{0.50}Co_{0.20}Mn_{0.30}O_2$ | 40% |
| Example 8 | 50% | 1.89% | 60% | 1.08% | 2.2% | $LiNi_{0.50}Co_{0.20}Mn_{0.30}O_2$ | 50% |
| Example 9 | 70% | 1.89% | 60% | 1.44% | 2.6% | $LiNi_{0.60}Co_{0.20}Mn_{0.20}O_2$ | 30% |
| Example 10 | 70% | 1.89% | 60% | 1.44% | 2.6% | $LiNi_{0.70}Co_{0.20}Mn_{0.10}O_2$ | 30% |
| Example 11 | 70% | 1.89% | 60% | 1.44% | 2.6% | $LiNi_{0.80}Co_{0.10}Mn_{0.10}O_2$ | 30% |
| Example 12 | 70% | 1.89% | 60% | 1.44% | 2.6% | $LiNi_{0.90}Co_{0.05}Mn_{0.05}O_2$ | 30% |
| Example 13 | 70% | 2.12% | 65% | 1.46% | 2.70% | $LiNi_{0.80}Co_{0.10}Mn_{0.10}O_2$ | 30% |
| Example 14 | 70% | 1.98% | 65% | 1.46% | 2.70% | $LiNi_{0.80}Co_{0.10}Mn_{0.10}O_2$ | 30% |
| Example 15 | 70% | 2.05% | 65% | 1.46% | 2.70% | $LiNi_{0.80}Co_{0.10}Mn_{0.10}O_2$ | 30% |
| Comparative example 1 | 100% | 1.89% | 60% | 1.98% | 3.2% | / | / |
| Comparative example 2 | 70% | 1.13% | 50% | 1.41% | 2.4% | $LiNi_{0.80}Co_{0.10}Mn_{0.10}O_2$ | 30% |
| Comparative example 3 | 70% | 3.06% | 60% | 1.44% | 2.6% | $LiNi_{0.50}Co_{0.20}Mn_{0.30}O_2$ | 30% |

Battery Test (1) Test of Coating Layer Thickness

The coating layer thickness was tested mainly in the following manner. A thin slice with a thickness of about 100 nm was cut through FIB from the middle of a single particle of the prepared positive electrode active material, then a TEM test was performed on the thin slice, and original TEM test images were obtained and saved in an original image format (xx.dm3).

The original image obtained from the TEM test was opened in DigitalMicrograph software, a coating layer was identified based on information of lattice spacing and included angle, and a coating layer thickness was measured.

Thicknesses at three positions of the selected particle were measured and an average value was taken.

(2) Test of Particle Size $D_v50$ (2) The particle size $D_v50$ was measured using a method in accordance with the national standard GB/T 19077-2016 Particle Size Distribution Laser Diffraction Method, where deionized water was used as a solvent, and ultrasonic treatment was performed for 5 minutes before testing.

(3) Test of Dissolution Amount of Mn

A battery cycled at 45° C. until its capacity decayed to 80% was discharged to a cut-off voltage of 2.5 V at a rate of 0.1 C. Then, the battery was disassembled, and a negative electrode plate was taken out, and 30 discs with a unit area (1540.25 mm²) were randomly taken from the negative electrode plate and tested using Agilent ICP-OES730 and inductively coupled plasma emission spectroscopy (ICP). The amount of Mn was calculated based on the ICP result, so that the dissolution amount of Mn after cycling. The test standard was in accordance with EPA-6010D-2014.

(4) Test of Cycling Performance

At a constant temperature of 25° C., the battery was charged to 4.3 V at 0.33C, left standing for 10 min, and then discharged to 2.5 V at 1C. A capacity was recorded as $D_0$. The above process was repeated until the capacity decayed to 80% of $D_0$, and the number of cycles at that point was recorded. A percentage increase or decrease in the number of cycles relative to that of Comparative example 1 was calculated.

(5) Test of Storage Performance

At a constant temperature of 25° C., the battery was charged to 4.3 V at 0.33C and then discharged to 2.5 V at 0.33C. A discharge capacity $D_1$ was tested. Then, the battery was stored at a constant temperature of 60° C. and taken out every 30 days for testing. At every test, the battery was cooled to 25° C. The battery was first charged to 4.3 V at 0.33C and then discharged to 2.5 V at 0.33C. A discharge capacity was tested until the discharge capacity decayed to 80% of $D_1$, and the storage days at that point were recorded. A percentage increase or decrease in the storage days relative to those of Comparative example 1 was calculated.

Results of the above tests (1) and (2) were shown in Table 1. Results of the above tests (3) to (5) were shown in Tables 2 and 3.

TABLE 2

Test results of dissolution amount of Mn and cycling performance
of Examples 1 to 15 and Comparative examples 1 and 2

| No. | Dissolution amount of Mn (ppm) | Cycling performance |
| --- | --- | --- |
| Example 1 | 105 | 16% |
| Example 2 | 416 | 25% |
| Example 3 | 348 | 103% |
| Example 4 | 113 | 46% |
| Example 5 | 367 | 13% |
| Example 6 | 324 | 12% |
| Example 7 | 289 | 65% |
| Example 8 | 267 | 89% |
| Example 9 | 313 | 53% |
| Example 10 | 294 | 84% |
| Example 11 | 297 | 76% |
| Example 12 | 285 | 72% |
| Example 13 | 254 | 89% |
| Example 14 | 283 | 63% |
| Example 15 | 267 | 97% |
| Comparative example 1 | 786 | Reference |
| Comparative example 2 | 723 | −56% |

TABLE 3

Test results of storage performance of Examples
1 to 15 and Comparative examples 1 and 3

| No. | Storage performance |
| --- | --- |
| Example 1 | 3% |
| Example 2 | 7% |
| Example 3 | 2% |
| Example 4 | 8% |
| Example 5 | 4% |
| Example 6 | 9% |
| Example 7 | 11% |
| Example 8 | 21% |
| Example 9 | 18% |
| Example 10 | 3% |
| Example 11 | 6% |
| Example 12 | 7% |
| Example 13 | 13% |
| Example 14 | 11% |
| Example 15 | 8% |
| Comparative example 1 | Reference |
| Comparative example 3 | −48% |

It can be seen from Tables 2 and 3 that as compared with Comparative examples 1 and 2, the batteries in Examples 1 to 15 of this application each have a lower dissolution amount of Mn and higher cycling performance;

as compared with Comparative examples 1 and 3, the batteries in Examples 1 to 15 of this application each have higher storage performance; and as compared with Examples 5 and 6, the batteries in Examples 7 and 8 of this application each have a further reduced dissolution amount of Mn and further improved cycling performance and storage performance.

It should be noted that this application is not limited to the foregoing embodiments. The foregoing embodiments are merely examples, and embodiments having substantially the same constructions and the same effects as the technical idea within the scope of the technical solutions of this application are all included in the technical scope of this application. In addition, without departing from the essence of this application, various modifications made to the embodiments that can be conceived by persons skilled in the art, and other manners constructed by combining some of the constituent elements in the embodiments are also included in the scope of this application.

The invention claimed is:

1. A positive electrode active material composition comprising a first positive electrode active material and a second positive electrode active material, wherein the first positive electrode active material comprises a core and a coating layer covering the core; the coating layer comprises one or more of pyrophosphate, phosphate, and carbon; and the core comprises a compound $Li_aA_bMn_fB_{1-f}P_{1-d}R_dO_{4-n}D_n$, wherein A comprises one or more elements of Zn, Al, Na, K, Mg, Nb, Mo, and W;

B comprises one or more elements of Ti, V, Zr, Fe, Ni, Mg, Co, Ga, Sn, Sb, Nb, and Ge;

R comprises one or more elements of B (boron), S, Si, and N;

D comprises one or more elements of S, F, Cl, and Br;

a is 0.9 to 1.1; b is 0 to 0.1; f is 0.1 to 0.999; d is 0 to 0.11; and n is 0 to 0.1;

the second positive electrode active material comprises a compound $LiNi_xCo_yM_{1-x-y}O_2$, wherein M comprises one or more elements of Al, Mn, Mg, Nb, Ti, and Ba; $0.5 \leq x \leq 0.69$; and $0 < y < 0.31$;

and $0.018m + 0.003f \leq z \leq 0.02m + 0.02f$ is satisfied, wherein m represents a mass percentage of the first positive electrode active material in the positive electrode active material composition; and z represents a ratio of a coating layer thickness to a particle size $D_v50$ of the first positive electrode active material.

2. The positive electrode active material composition according to claim 1, wherein the coating layer thickness of the first positive electrode active material is 2-15 nm.

3. The positive electrode active material composition according to claim 1, wherein the particle size $D_v50$ of the first positive electrode active material is 400-1600 nm.

4. The positive electrode active material composition according to claim 1, wherein f is 0.3 to 0.8.

5. The positive electrode active material composition according to claim 1, wherein the coating layer of the first positive electrode active material comprises carbon.

6. The positive electrode active material composition according to claim 1, wherein m is 30%-80%.

7. A positive electrode plate comprising a positive electrode current collector and a positive electrode film layer disposed on at least one surface of the positive electrode current collector, wherein the positive electrode film layer comprises the positive electrode active material composition according to claim 1.

8. A positive electrode plate comprising a positive electrode current collector and a positive electrode film layer disposed on at least one surface of the positive electrode current collector, wherein the positive electrode film layer comprises a positive electrode active material; at least one positive electrode film layer has a multi-layer structure; different layers of the at least one positive electrode film layer with the multi-layer structure respectively comprise a first positive electrode active material and a second positive electrode active material; and the first positive electrode active material and the second positive electrode active material according to claim 1;

and 0.018m'+0.003f≤z≤0.02m'+0.02f is satisfied, wherein m' represents a mass percentage of the first positive electrode active material in the positive electrode active material;

z represents a ratio of a coating layer thickness to a particle size $D_v50$ of the first positive electrode active material.

9. The positive electrode plate according to claim 8, wherein m' is 30%-80%.

10. A battery comprising the positive electrode active material composition according to claim 1.

11. A battery comprising the positive electrode plate according to claim 7.

12. An electric apparatus comprising the positive electrode active material composition according to claim 1.

13. An electric apparatus comprising the positive electrode plate according to claim 7.

14. An electric apparatus comprising the battery according to claim 10.

* * * * *